July 1, 1924.

W. C. SPROUL

MILLING MACHINE

Filed March 22, 1920

INVENTOR.
William C. Sproul
BY
Ira J. Wilson
ATTORNEY.

July 1, 1924.
W. C. SPROUL
1,499,754
MILLING MACHINE
Filed March 22, 1920      4 Sheets-Sheet 4
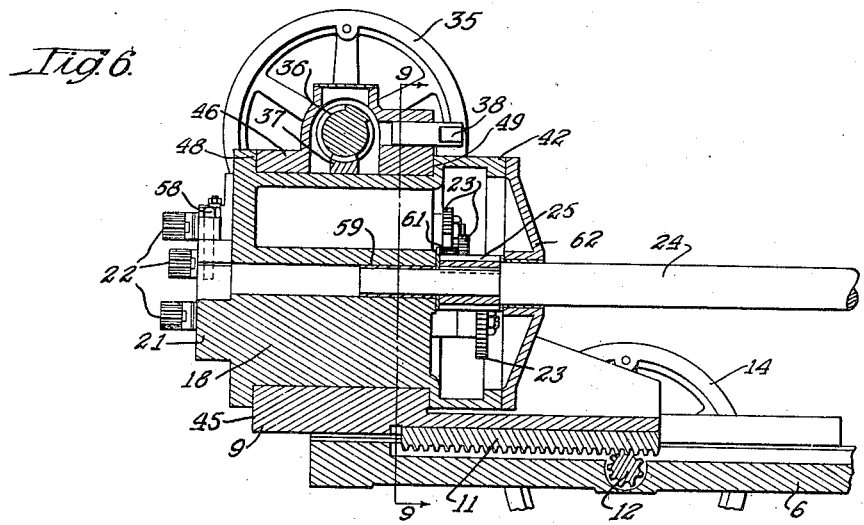
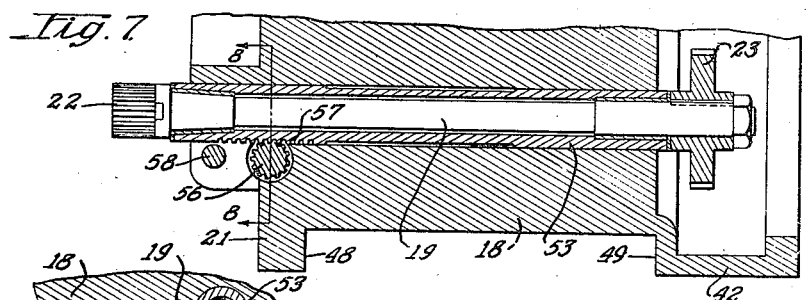
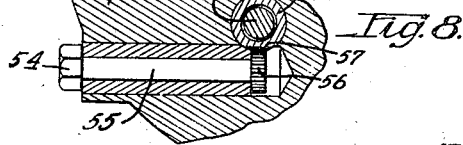
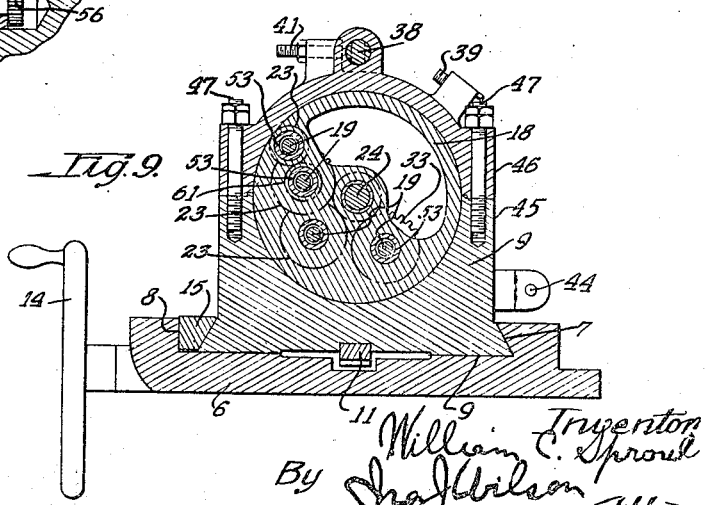

Patented July 1, 1924.

1,499,754

UNITED STATES PATENT OFFICE.

WILLIAM C. SPROUL, OF ROCKFORD, ILLINOIS, ASSIGNOR TO THE INGERSOLL MILLING MACHINE COMPANY, OF ROCKFORD, ILLINOIS, A CORPORATION OF ILLINOIS.

MILLING MACHINE.

Application filed March 22, 1920. Serial No. 367,951.

*To all whom it may concern:*

Be it known that I, WILLIAM C. SPROUL, a citizen of the United States, residing at Rockford, in the county of Winnebago and State of Illinois, have invented certain new and useful Improvements in Milling Machines, of which the following is a specification.

This invention relates in general to milling machines, and has more particular reference to those in which the cutter axis may be moved during the cut in a direction, usually at a right angle to its axis, in a feed motion.

One of the chief objects of the present invention is to provide in a milling machine of this kind, a drum type spindle housing equipped with one or more cutter-carrying spindles and mounted in a suitable head or saddle, as will be pointed out more particularly hereinafter, for the purpose of maintaining alignment of the spindles to a high degree of precision and for insuring accuracy in the milling of certain classes of work by rotative feed motion of the spindle housing.

This drum type spindle housing may be applied in various ways in milling machines, and in the present illustration, of my invention, I have taken as an example its application to a machine designed for surfacing the ends of a plurality of bosses projecting from a casting. Jobs of this kind are frequent in the manufacture of engines and other parts in the automotive industry; and in view of the large production and rigid dimensional requirements in the manufacture of such parts, it is essential that the machine shall do continuous service and that the work performed shall be uniform and accurate. It should be understood, therefore, that the particular embodiment herein disclosed is for illustrative purpose merely, and that my invention may be embodied in various forms according to the nature of the work. In practice, a machine of this kind, designed for a particular job, is referred to as a special-purpose machine.

While my invention in its broader aspect pertains primarily to the drum type spindle housing and the rotative feed motion therefor, it also contemplates certain improvements in the mounting of such housing, the means for imparting feed motion thereto, the means for driving the spindles, and to the means for adjusting the housing support or saddle with respect to the work.

Other objects and attendant advantages will be appreciated by those skilled in this art as the invention becomes better understood by reference to the following description when considered in connection with the accompanying drawings, in which—

Fig. 5 is a view of the cutter end of the drum type spindle housing, showing in dotted lines location of the bosses to be milled;

Fig. 6 is a vertical longitudinal sectional view taken substantially on the line 6—6 of Fig. 1;

Fig. 7 is an enlarged sectional view taken substantially on the line 7—7 of Fig. 5;

Fig. 8 is a sectional view taken on the line 8—8 of Fig. 7; and

Fig. 9 is a sectional view taken on the lines 9—9 of Fig. 6.

Figure 1:
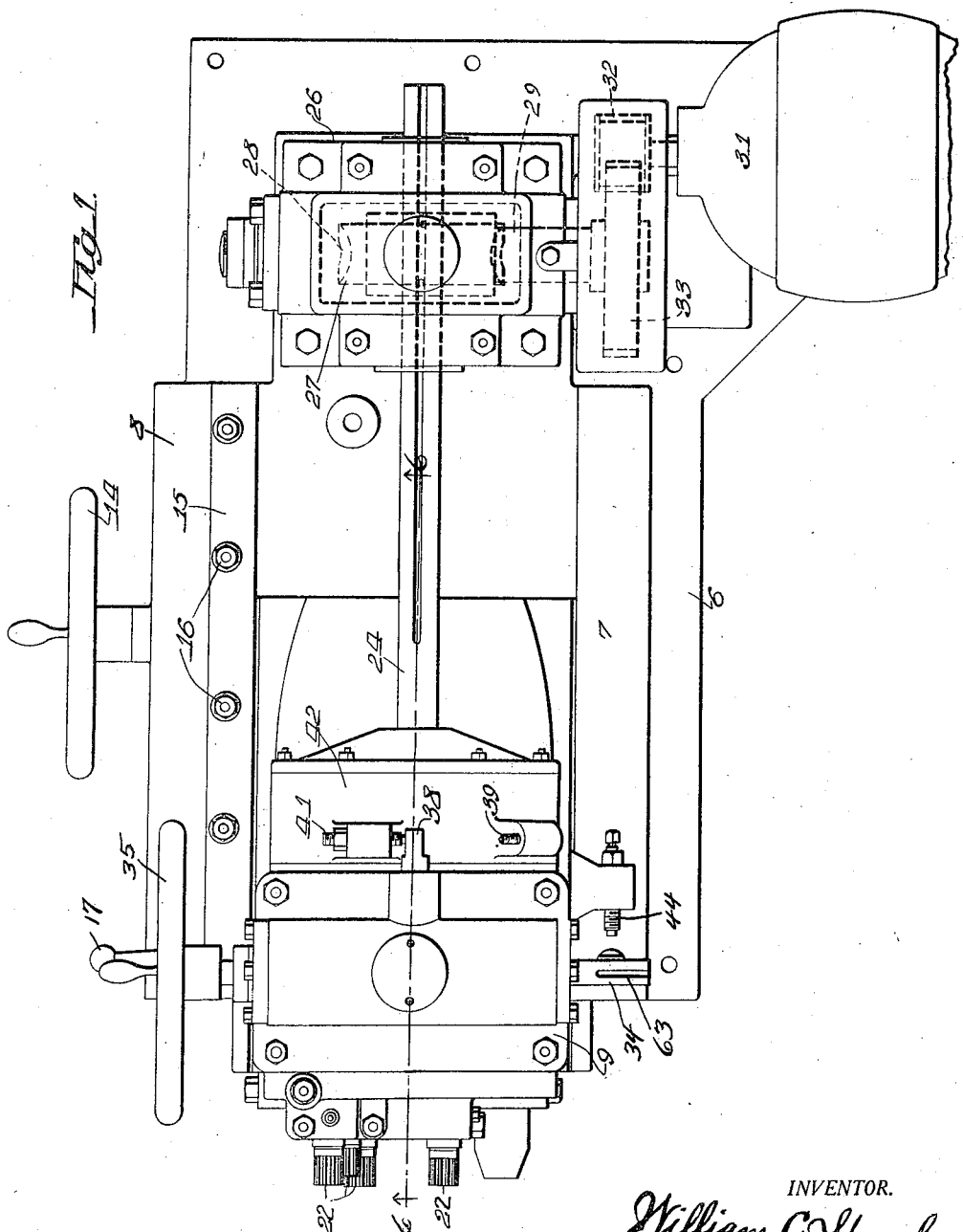
Figure 1 is a plan view of a milling machine embodying my invention.
Figure 2:
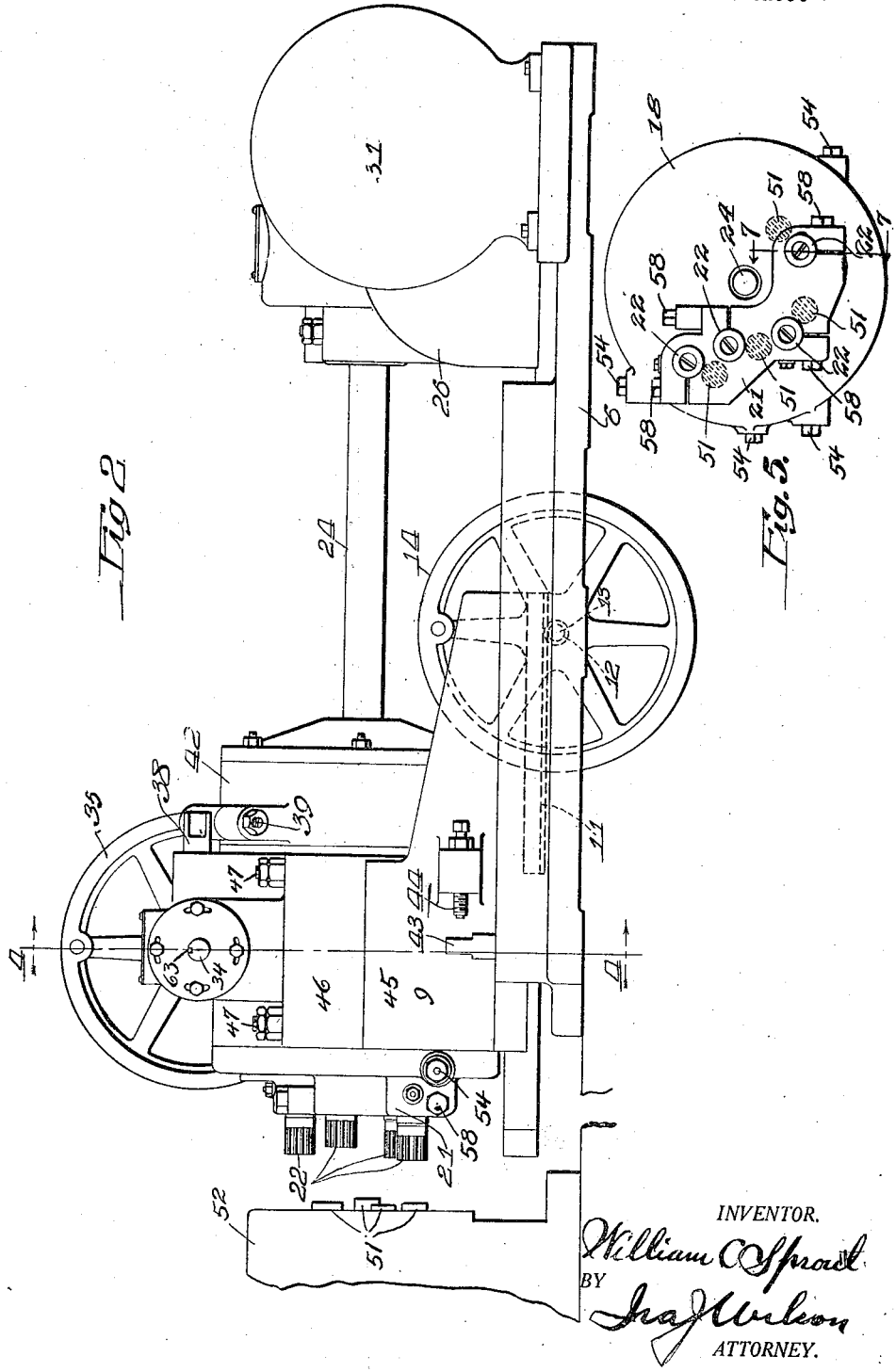
Fig. 2 is a side elevation thereof.
Figure 3:
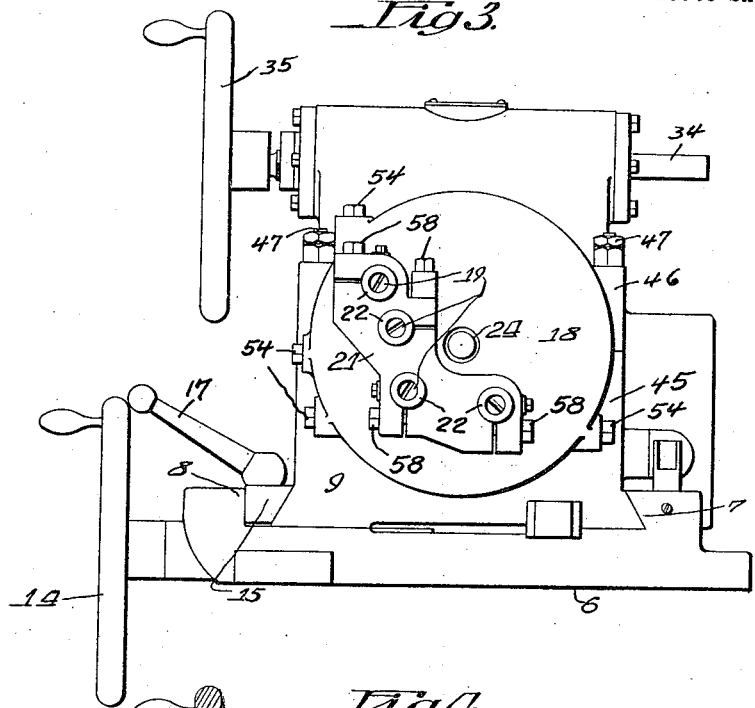
Fig. 3 is an end elevation.
Figure 4:
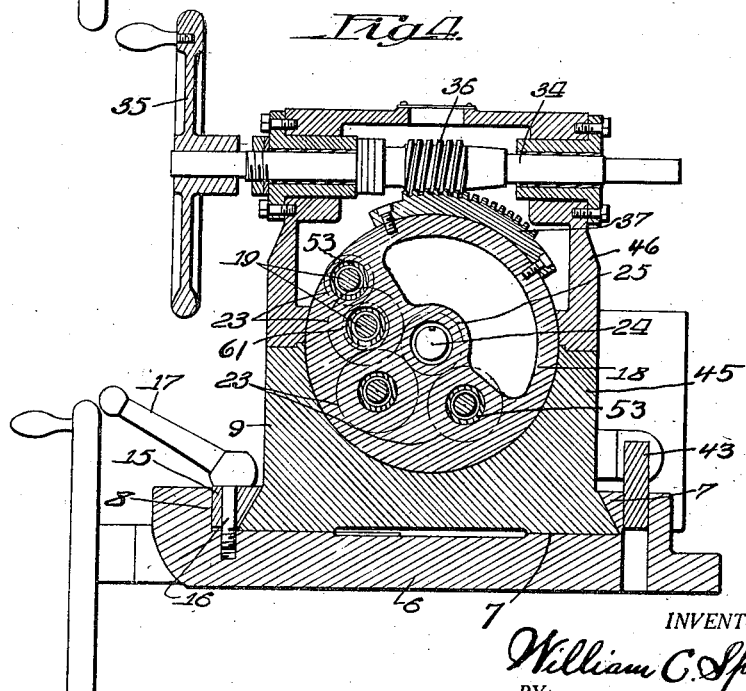
Fig. 4 is a transverse sectional view taken on the line 4—4 of Fig. 2.

By referring to the drawings, it will be observed that a base or bed 6 is provided having suitable ways 7 and 8 upon which is slidable a saddle or drum supporting head designated generally by 9. The saddle carries a fixed rack 11 with which meshes a pinion 12 fixed to a transverse shaft 13, which in turn carries a hand wheel 14 adapted to be rotated for adjusting the saddle longitudinally on the bed. A gib 15 performs its usual function and is held in position by bolts 16. One of these bolts is fixed to a handle 17 adapted to be turned for clamping the gib in a wedging action between the bed and saddle for locking the latter in a fixed position or for taking up wear. While in the present example, the saddle 9 which carries the drum type spindle housing is mounted for adjustment on a suitable support, such as a bed, it should be understood that said housing which will be presently more fully described, may be mounted in any suitable supporting structure regardless of whether it is movable or adjustable on ways.

The spindle housing designated generally by 18, in the form of a drum, has an elongated cylindrical body seated and journaled for rotative movement on a bearing provided by the saddle 9. In the present instance, said saddle is composed of lower and upper parts 45 and 46 respectively, secured together by bolts 47, each saddle part providing an internal semi-cylindrical bearing for the spindle housing. Said housing has annular end flanges 48 and 49, which bear against the contiguous ends of the saddle and take the end thrust. It will be observed that the spindle housing has a comparatively long peripheral bearing on the saddle, the purpose of which is to provide a very stable support for the spindles carried in the housing, as will be presently described, and to maintain permanent alignment of the housing and its spindles under the heavy lateral strains and pressures to which these parts are subjected during operation. This large peripheral bearing surface also insures a very rigid support for the spindles, and is an important factor in preventing vibration of the spindles and cutters during operation.

The cutter spindles designated generally by 19, are suitably journaled in the housing 18 parallel with its axis and preferably reach beyond both ends of the housing proper. The number and arrangement of the spindles may vary according to the work requirements. In this instance, four spindles are shown, arranged at different radial distances from the center of the housing and equipped with milling cutters 22 for milling the ends of the bosses 51 on a work-piece 52. Each spindle, as shown on Fig. 7, is journaled in a sleeve 53, in turn mounted to slide axially in the housing 18. To this end, each spindle may be adjusted by turning a head 54 which projects from the housing end 21 and is fixed to a shaft 55 journaled in said housing end and equipped with a pinion 56 meshing with a rack 57 on its respective spindle sleeve. Each spindle may be locked in the adjusted position by tightening a clamping bolt 58.

The spindles will be driven by gearing from a drive shaft 24, mounted concentrically with the spindle housing and having a bearing 59 therein. Said gearing comprises an elongated driving pinion 25 fixed to the shaft 24, and a gear 23 fixed to the inner end of each spindle, three of these spindle gears meshing directly with the drive pinion 25 and the fourth being driven through an intermediate gear 61 fixed to the adjoining spindle. While I have shown a specific arrangement of gearing for driving the spindles, it should be understood that any suitable means may be employed for this purpose, although gearing is preferred. In this embodiment, I have provided a gear housing 42 integral with the spindle housing 18, this housing being open at its end to permit access to the gearing, such opening being closed by a suitable cover 62.

The drive shaft 24 is journaled at its opposite end in suitable bearings carried by a housing 26 mounted upon the bed 6, and between these bearings a worm wheel 27 is splined on the drive shaft. A worm 28 meshing with said worm wheel 27 is fixed to a shaft 29 journaled in said housing 26 and driven from an electric motor 31 through the agency of a motor pinion 32 meshing with a gear 33 fixed to said shaft 29. It will be apparent from the foregoing that by means of the driving train disclosed, the spindles will be simultaneously driven, and that while so driven the spindle housing may be moved rotatably in its saddle for the purpose of imparting feed motion to the spindles in their plane of rotation. It should be understood, however, that my invention is in no way limited to the particular driving train herein disclosed, and that any suitable means may be provided for driving the spindles.

The feed motion referred to is obtained by the operation of the feed mechanism which imparts rotative movement to the spindle housing which carries the cutters across the surfaces to be milled. In the present instance, the spindle will be oscillated, the movement in one direction being for the feed, and in the opposite for returning the cutters to a starting position. My invention is not, however, limited to this particular rotative movement of the spindle housing as it will be manifest that the feed mechanism disclosed herein has been provided for the particular work to be performed, namely, the surface milling of a series of bosses. Consequently, the feed mechanism, as in the case of the number and arrangement of the spindles, may be suited to the particular work. At present, I have shown a manually operable feed mechanism, comprising a shaft 34 mounted in suitable bearings in the upper part 46 of the saddle 9 and equipped with a hand wheel 35 and a worm 36 which meshes with a toothed segment 37 fixed upon the periphery of the spindle housing. The end of the shaft 34 opposite from the handle end extends beyond the saddle for carrying a driving element such as a gear, which may be power driven, if desired, a key way 63 being provided in this end of the shaft for connecting such driving element thereto. It will be manifest that by rotation of the worm shaft 34 in one direction, the spindle housing will be rotatably moved in the saddle to feed the cutters across the bosses 51 for milling the end surfaces thereof, and that by reversing the drive the drum will be moved in the opposite direction to return the spindles to the starting position.

For the purpose of limiting the oscillatory movements of the drum I have provided a stationary stop or abutment 38 on the upper part of the saddle and two adjustable stop screws 39 and 41 threadedly engaged in bosses integral with the spindle housing. It will be manifest that the screw stops 39 and 41 may be adjusted to limit the oscillatory movements of the spindle housing in both directions. For limiting approach of the saddle to the work, I have provided a suitable adjustable screw stop 44 on the saddle, which is adapted to abut against a fixed stop 43 on the bed.

In operating the present machine, the cutters will be properly adjusted or set with relation to the bosses for surfacing them in accordance with the dimensional requirements. To this end, the saddle 9 will be fed forwardly on the bed by turning the hand wheel 14, and when the cutters are in proximity to the bosses, the screw stop 44 will be set as a limit to movement in this direction. The spindles will then be adjusted by means of the heads 54 for setting the respective cutters to depth, that is, at positions determinative of the finished surfaces. The spindle housing will then be turned on its bearing in the saddle in a counter-clockwise direction viewing Fig. 5, in a feed motion, for moving the cutters in arcuate paths across the ends of the bosses 51 for milling such ends. It will be observed viewing such figure, that the spindles are positioned in the same relative relation as the bosses so that the latter will be simultaneously milled. In this way a number of surfaces located in different planes and at different positions may be milled very quickly and accurately. It will be further observed that a high degree of accuracy may be attained, due to the permanent alignment and stability of the spindle housing and to the arcuate feed motion of the spindles in the plane of rotation, which permits setting of the cutters to predetermined depth and insures that the surfaces will be positively milled to such depth.

In this way greater accuracy is obtained than in those types of machines in which the cutters have an axial feed movement which is limited generally by contact of stop elements, and in which the feed pressure may vary considerably in the final application; consequently, cutting either short of or beyond the desired mark, thereby lowering the standard of uniformity. After completion of the cut, the milling head may be backed away from the work and the spindles returned to the starting position by operation of the hand wheels 14 and 35, as will be obvious. As mentioned above, it is not essential to this invention that the spindle head or saddle be moved to and from the work, since obviously this result may be obtained by movement of the work-piece with respect to the spindle head.

It is believed that the foregoing conveys a clear understanding of a practical application of my invention, and it should be understood that it is capable of embodiment in a wide variety of forms and constructions within the spirit and scope of the appended claims.

I claim:

1. In a milling machine, the combination of a spindle-carrying drum, a plurality of spindles carried thereby and equipped with cutters, means for oscillating said drum to bring the spindle cutters into operative relation with the work, and means for adjusting said drum and the spindles carried thereby longitudinally to regulate the depth of cut.

2. In a milling machine, the combination of a drive shaft, a spindle-carrying drum concentric therewith, a plurality of cutter spindles carried by said drum and operatively connected with said shaft to be revolved thereby, means for oscillating said drum and the spindle carried thereby, and means for longitudinally adjusting said drum.

3. In a milling machine, the combination of an oscillatory spindle carrier, a plurality of spindles rotatably mounted therein, means for simultaneously rotating said spindles, means for oscillating the carrier and the spindles carried thereby, and adjustable means for limiting the extent of the oscillatory movements of said carrier.

4. In a milling machine, the combination of a bed having longitudinal guideways, a work support in longitudinal alignment with said guideways, a drum support mounted to slide on said ways, a spindle-carrying drum mounted on the latter support to move about an axis parallel with said ways, a cutter spindle on said drum on an axis eccentric but parallel with respect to that of the drum and adapted for carrying a cutter at its end adjacent to the work support, means for revolving the spindle, and means for moving the drum about its axis for feeding the cutter in its plane of rotation into and out of operation on a work-piece carried by said work support.

5. In a milling machine, the combination of a work support, a drum support mounted to slide on ways toward and from the work support, a spindle-carrying drum having a peripheral bearing on said drum support and adapted to be oscillated on said bearing about an axis parallel with said ways, a spindle-driving shaft concentric with the drum, a plurality of cutter spindles journaled in the drum within its peripheral bearing and eccentric with respect to said driving shaft, gearing between said shaft and spindles, said spindles projecting from the end of the drum adjacent to the work support, cutters on said projecting ends of the spindles, and means for oscillating the drum to feed the cutters into and out of operation.

6. In a milling machine, the combination of a work support, a drum carrier mounted to slide on ways toward and from said work support, a drum mounted to oscillate on said drum support on an axis parallel with said ways, a plurality of spindles mounted in parallel relation in said drum and equipped with cutters at the end adjacent to the work support, means for revolving the spindles, and a worm on said drum support meshing with the teeth on the drum and adapted to be revolved for oscillating the drum in feed and return movements.

7. In a milling machine, the combination of a drum type spindle housing, a support in which said housing is journaled, a cutter spindle journaled in the housing, a gear housing fixed to the spindle housing, gearing in said gear housing for driving said spindle, and feed mechanism for imparting rotative feed motion to the spindle housing.

8. In a milling machine, the combination of a spindle housing in the form of a drum, peripheral bearing support therefor, a plurality of cutter spindles journaled in the housing parallel with its axis, a central drive gear, gearing between said drive gear and the spindles, means for individually adjusting the spindles axially, and feed mechanism for imparting rotative feed motion to the housing.

9. In a milling machine, the combination of a spindle housing having an elongated drum body and end thrust faces at the ends thereof, an annular bearing in which said drum body is journaled, means for taking the end thrust from said end thrust faces, a cutter spindle journaled in the housing parallel with its axis, and feed mechanism for imparting rotative feed motion to said housing.

10. In a milling machine, the combination of a base having ways, a saddle mounted to slide on said ways, a spindle housing in the form of a drum journaled in said saddle, a plurality of cutter spindles journaled in the housing, means for feeding the slide on said ways, and feed mechanism for imparting rotative feed motion to the housing.

11. In a milling machine, the combination of a base having ways, a saddle mounted to slide on said ways, a spindle housing in the form of a drum journaled in said saddle, cutter spindles journaled in said housing, means for driving the spindles, means for adjusting the spindles axially in the housing, means for feeding the saddle on said ways, and feed mechanism for imparting rotative feed motion to the housing.

12. In a milling machine, the combination of a drum type spindle housing, a support in which said housing is journaled, an elongated drive gear coaxial with the housing, a plurality of cutter spindles in the housing, gearing between said drive gear and spindles including a gear fixed to each spindle, said gear permitting axial adjustment of the spindles, means for so adjusting the spindles, and feed mechanism for imparting rotative feed motion to the housing.

WILLIAM C. SPROUL.